United States Patent [19]

Yandell

[11] 4,058,900
[45] Nov. 22, 1977

[54] INSIDE AND OUTSIDE CALIPER AND TOOL-JOINT IDENTIFIER

[76] Inventor: James L. Yandell, 706 Shenandoah, Conroe, Tex. 77302

[21] Appl. No.: 662,865

[22] Filed: Mar. 1, 1976

[51] Int. Cl.$^2$ .......................... G01B 5/08; G01B 5/12
[52] U.S. Cl. ................................ 33/148 E; 33/199 R
[58] Field of Search ............ 33/148 R, 148 E, 148 F, 33/149 R, 153 R, 199 R

[56] References Cited

U.S. PATENT DOCUMENTS

| | | | |
|---|---|---|---|
| 552,238 | 12/1895 | Darling ..,......................... | 33/199 R |
| 924,073 | 6/1909 | Hughs .............................. | 33/148 E |
| 1,243,343 | 10/1917 | Roberts ............................ | 33/148 E |
| 1,269,336 | 6/1918 | Taylor .............................. | 33/148 E |
| 1,285,175 | 11/1918 | Hinkle .............................. | 33/148 E |
| 2,364,805 | 12/1944 | Nash ................................. | 33/153 R |
| 2,663,086 | 12/1953 | Gardner ........................... | 33/148 E |
| 2,733,512 | 2/1956 | Confalone ....................... | 33/148 E |
| 2,849,798 | 9/1958 | Messimer ......................... | 33/148 E |
| 2,979,825 | 4/1961 | Westbrook ....................... | 33/148 E |

*Primary Examiner*—Richard E. Aegerter
*Assistant Examiner*—Richard R. Stearns
*Attorney, Agent, or Firm*—Clarence A. O'Brien; Harvey B. Jacobson

[57] ABSTRACT

A tool joint caliper and identifier particularly adapted for use in making up a drill string employed in an oil well drilling operation. The caliper and identifier includes a pair of pivotally connected caliper arms having contact points at an end thereof remote from the pivotal connection for engagement with a pin tool joint or a box tool joint. The other end of each of the arms includes an extension with one extension being in the form of a panel having concentrically spaced arcuate graduated scales thereon together with associated indicia and the other extension includes a pointer having a radially inwardly extending point and a radially outwardly extending point associated with the graduated scales for indicating the diameter of the tool joint and identifying the tool joint engaged by the contact points. Each graduated scale includes two circumferentially spaced arcuate scales with one set of arcuate scales measuring the external diameter of a pin tool joint and identifying the pin tool joint and the other set of arcuate scales measuring the internal diameter of a box tool joint and identifying the box tool joint. The extension having the graduated scales and indicia thereon also includes thread measuring gauges which combined with the caliper and identifier facilitate the making up of a drill string.

1 Claim, 8 Drawing Figures

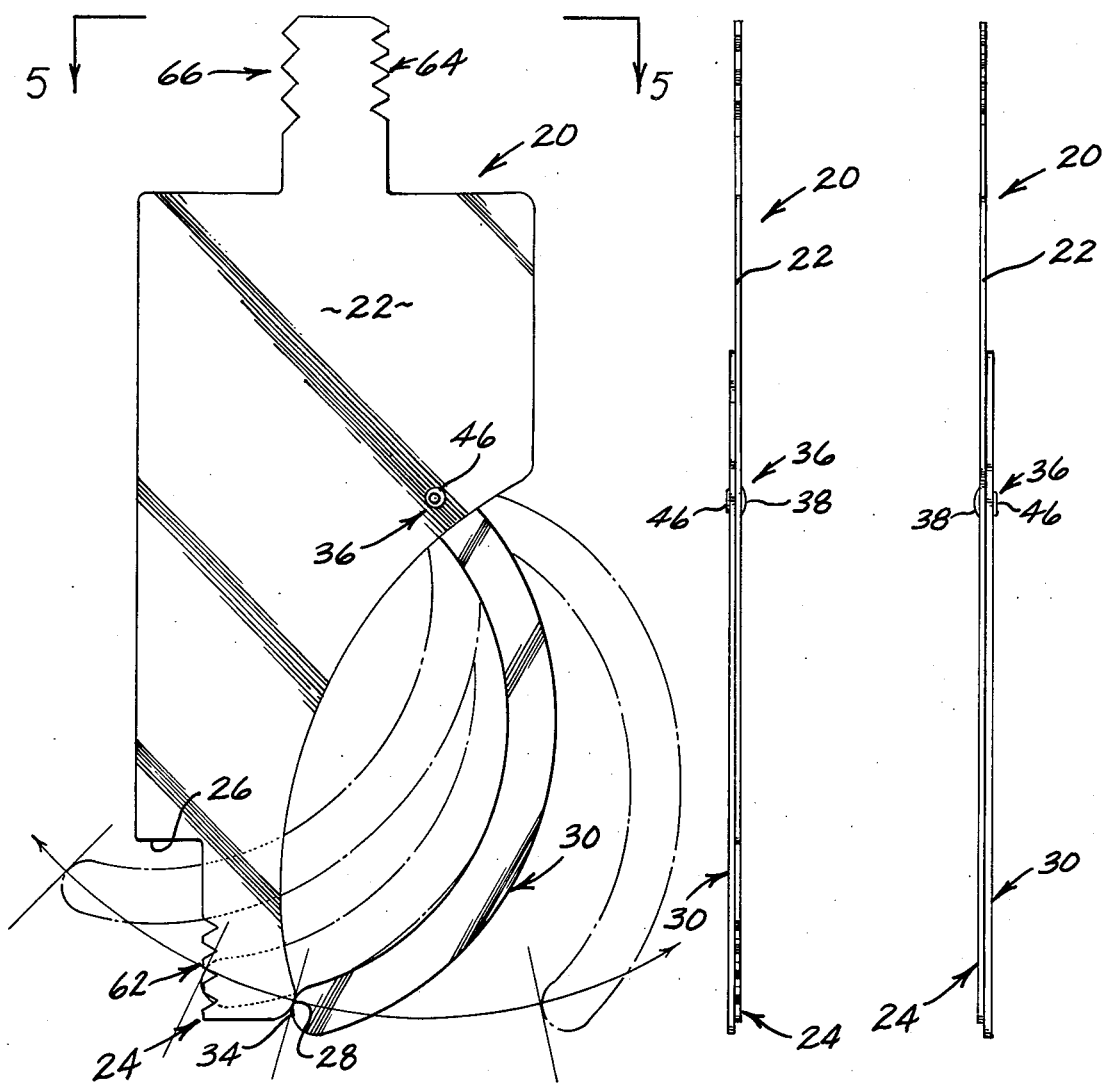
FIG. 2  FIG.3  FIG.4
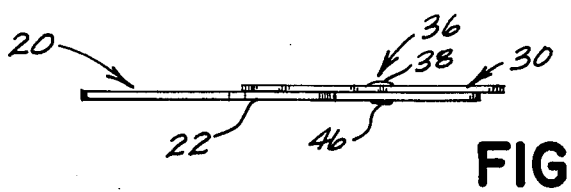
FIG. 5
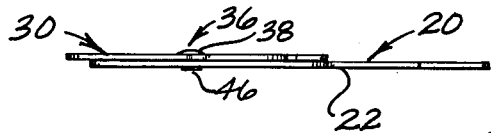
FIG. 6
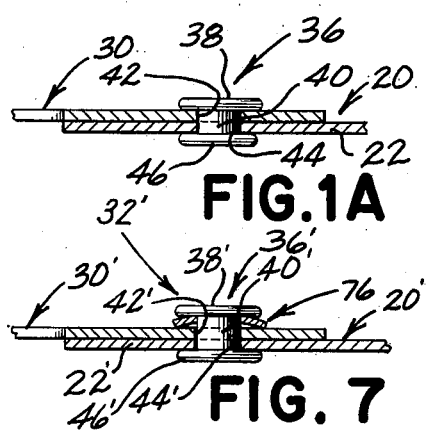
FIG.1A
FIG. 7

INSIDE AND OUTSIDE CALIPER AND TOOL-JOINT IDENTIFIER

BACKGROUND OF THE INVENTION

In the drilling equipment apparatus and machine art it is conventional to assemble multiple individual lengths of longitudinal pipe (which shall also be construed broadly enough to include rods) to provide any desired resultant length of the assembly to make it possible to drill to great depths. The junction of individual elements of such drill pipe is conventionally provided by what are known in the art as tool joints and which merely comprise various types of threaded joints, or junction members, in each case including a male, exteriorly threaded, portion generally referred to as the pin, and a female, interiorly threaded portion, generally referred to as the box. The threads may be of any type, in cross-section, of any pitch, and may extend along a cylindrical interior core portion or may extend along a core portion of generally conical form, and there are a number of such conventional types and sizes of tool joints. Of course, it is requisite when assembling such a long string of drill pipe sections, or the like, to match the male threaded pin member with the proper female threaded box member and this task often requires a considerable period of time if the person doing the assembly is not already certain of the specific tool joint pin and tool joint box sizes and types to be threadedly engaged. It is precisely for the purpose of solving this prior art problem and greatly simplifying the quick, complete, and specific identification of any particular unknown tool joint pin or tool joint box that the novel apparatus of the present invention has been invented and developed as detailed hereinbelow.

SUMMARY OF THE INVENTION

The novel tool joint identifier of the present invention includes an inside and outside caliper feature which makes it possible to use it for measuring inside diameters and outside diameters of any of a great many different objects which may be found around a drilling site, or the like, when actual measurements are desired. When tool joint pin or tool joint box specific identifying information, (rather than actual dimensions) are required, the main function of the apparatus comes into play and this is provided by the novel structure of the device comprising a substantially flat planar display panel provided with display surface means (usually an upper display surface) and having a first caliper arm extending rigidly outwardly from one end thereof. The device also includes a second caliper arm provided with effectively hinged or pivotal mounting means adjacent to a rear end thereof and relatively pivotally mounting said entire second caliper arm for effective pivotal movement thereof relative to said first caliper arm, with said first and second caliper arms each having an outer workpiece-engageable contact end outwardly displaced from the pivotal mounting means by a substantially equal distance and being relatively movable toward and away from each other with respect to a substantially common interviewing measurement plane substantially parallel to and usually co-planar with respect to the display surface means of the display panel means. Outer edges of the workpiece-engageable contact end of caliper arms are spaced apart in any given relative positions thereof by a distance greater than the spacing between the inner edges of said caliper arms except when they are in crossed-over relationship. Since the device is arranged to measure inside diameters by slidably crossing over the two workpiece-engageable contact ends of the two caliper arms, the minimum inside diameter which can be measured corresponds to the width of the two superimposed contact ends of said caliper arms in the cross-over position between an outside diameter measuring relationship thereof and an inside diameter measuring relationship thereof, and twice said superimposed contact end width will be arbitrarily referred to as the composite, superimposed contact end width, which is of importance primarily because the arcuate displacement of the tool-joint-pin-identifying scale means and the tool-joint-box-identifying scale means will in general, be a function of said composite, superimposed contact end width dimension as referred to hereinafter.

The rear end of the second caliper arm is provided with one element of multi-element displacement and tool pin and tool box indicating means which, in a preferred form, comprises pointer means having a combination tool-joint-pin-indicating marker means and tool-joint-box-indicating marker means and a separate caliper-end-displacement-indicating marker means. The display surface means of the display panel means is provided with a pair of arcuately displaced and arcuately directed scale means comprising a tool-joint-pin-identifying scale means and a separate tool-joint-box-identifying scale means at different locations arcuately spaced apart a distance determined by the previously mentioned total composite, superimposed caliper end width distance, or dimension, as modified by the different lever arm lengths of the effective portions of the caliper arms on each side of the pivotal mounting means. The arrangement is such that a definite correlation exists between the outside diameter measured by the caliper means when measuring the exterior of a tool joint pin and the particular tool-joint-pin-identifying information indicated by the tool-joint-pin-indicating marker means on the tool-joint-pin-identifying scale means, and between the inside diameter actually measured by the caliper means when measuring a tool joint box, and the indication provided by the tool-joint-box-indicating marker means (which is the same as the tool-joint-pin-indicating marker means) on the tool-joint-box-identifying scale means. Thus, it will be possible to quickly determine corresponding tool joint pin and tool joint box sizes and all that will remain to provide exact mating correlation between the two, will be the checking of thread type and size on each of multiple thread gauge means carried by the display panel means in convenient accessible positions for thread-gauging usage. The display surface means of the display panel means is also provided with two different actual caliper-end-displacement-measuring-and-indicating scale means, with displacement measurements properly positioned thereon and cooperating with corresponding marker means of the pointer means positioned adjacent thereto and corresponding to, and measuring, actual outside diameter measurements measured by inside edges of said side contact ends and to actual inside diameter measurements crossed-over contact ends, with said actual displacement marker means being cooperable with corresponding inside and outside measurement portions of said displacement measuring scale means to provide actual outside diameter and inside diameter measurement information.

The pivotal mounting means, in a preferred form, comprises mounting rivet means frictionally fastening the relatively movable second caliper arm with respect to the display panel means carrying the first caliper arm whereby to positively maintain any desired relative rotary positions thereof into which said second movable caliper arm and said display panel means (and said first caliper arm attached thereto) have been manually adjusted until subsequently manually over-ridden during repositioning adjustment thereof. If desired, a biasing means such as a conical or convex or dished cup washer of the type commonly known as a "Bellville" washer may be positioned between either the head portion of the rivet and the second caliper arm, or between the enlarged opposite end portion of the rivet and the display panel means, or between the display panel means and the relatively rotatable portion of the second caliper arm, so as to maintain a positive biasing force which at all times produces the desired friction between the relatively rotatively movable parts.

OBJECTS OF THE INVENTION

With the above points in mind, it is an object of the present invention to provide a novel inside and outside caliper and tool-joint-pin-identifying and tool-joint-box-identifying device intended primarily for use in quickly identifying any particular male tool joint pin or female tool joint box for joining drill pipe or the like together so that there will be no delay involved in quickly identifying same. This is a task performed frequently around oil wells where multiple lengths of drill pipe are joined together and separated from each other frequently during conventional oil well drilling practice, and anything which will facilitate the quick identification of precisely what male tool joint pin one has to match with a corresponding female tool joint box, in order to provide for the proper mating of same, will be most helpful — and this is precisely the major object of the present invention.

It is a further object of the present invention to provide a novel device of the character referred to herein, generally and/or specifically, which may include any or all of the features referred to herein, either individually or in combination, and which is of extremely simple, inexpensive, easy-to-manufacture construction such as to be suitable for ready mass manufacture and distribution at extremely low cost, both as to the initial cost (including tooling and production set-upcosts, etc.) and as to the subsequent per-unit manufacturing costs whereby to be conductive to widespread production, distribution, sale, and use of the invention for the purposes outlined herein or for any substantially equivalent or similar purposes.

Further objects are implicit in the detailed description which follows hereinafter (which is to be considered as exemplary of, but not specifically limiting, the present invention), and said objects will be apparent to persons skilled in the art after a careful study of the detailed description which follows.

BRIEF DESCRIPTION OF THE DRAWINGS

For the purpose of clarifying the nature of the present invention, two exemplary embodiments of the invention are illustrated in the hereinbelow-described figures of the accompanying two drawing sheets and are described in detail hereinafter.

FIG. 1A is an enlarged, fragmentary, cross-sectional view of the pivotal mounting means taken along the plane and in the direction indicated by the arrows 1A—1A of FIG. 1.

FIG. 2 is a reduced-size, rear elevational, view of the device of FIG. 1 and, in solid lines, shows the two caliper arms close to the cross-over relationship of the contact ends thereof; said cross-over relationship being shown to the left thereof in the intermediate phantom line position of the second, smaller caliper arm. This view arm also shows two other positions of the second caliper arm in phantom lines, the right one indicating the entire apparatus in an outside diameter measuring relationship, the left phantom line position of the second caliper arm indicating the entire apparatus in an inside diameter measuring relationship of the two caliper arms — it being understood that the intermediate phantom-line position of the second caliper arm shows the apparatus in an intermediate position between an extreme outside diameter measuring position and extreme inside diameter measuring position in what might be termed a contact end composite, superimposed, cross-over relationship.

FIG. 3 is a left side elevational view of FIG. 2.

FIG. 4 is a right side elevational view of FIG. 2.

FIG. 5 is a top plan view of FIG. 2 taken substantially along the plane and in the direction indicated by the arrows 5—5 of FIG. 2.

FIG. 6 is a bottom plan view taken substantially along the plane and in the direction indicated by the arrows 6—6 of FIG. 1.

FIG. 7 is a fragmentary, partially broken-away, cross-sectional view similar to FIG. 1A, but illustrating a slightly modified form of the pivotal mounting means wherein it is provided with resilient biasing means operable to at all times maintain the desired frictional engagement between the relatively rotatively movable and the non-movable parts of the complete pivotal mounting means.

DESCRIPTION OF THE PREFERRED EMBODIMENTS

Figure 1:
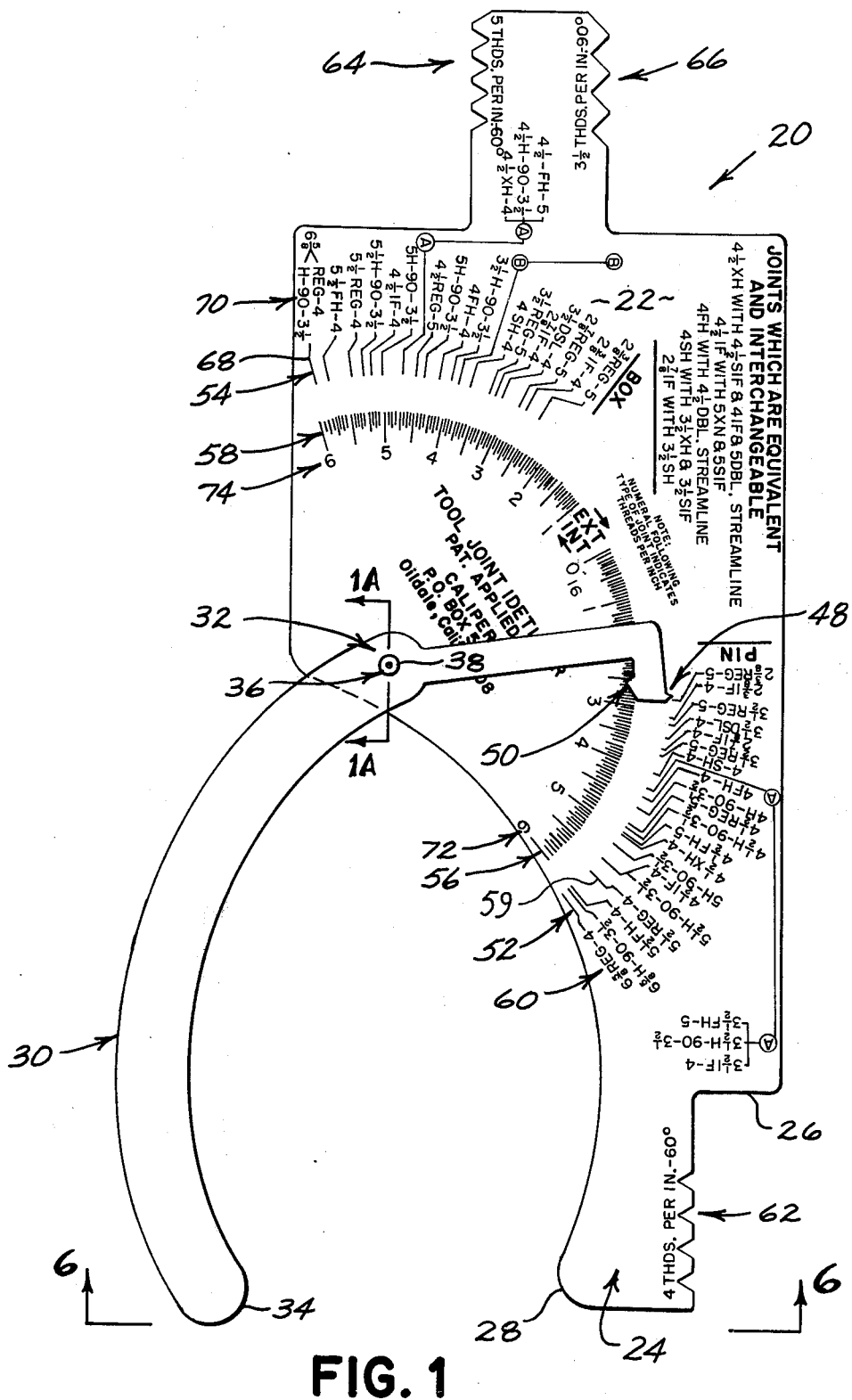
FIG. 1 is a reduced-size plan view illustrating one exemplary embodiment of the invention in an operative condition with the two caliper arms spaced apart by what might be termed an intermediate or substantially mid-range spacing.

The novel tool-joint identifier of the present invention, in the representative exemplary form shown, comprises a planar display member, such as is generally designated by the reference numeral 20, which is usually made of thin sheet-metal or other rigid structurally strong material when in thin sheet form and which is of modified rectangular shape as seen in top plan view in FIG. 1 (although not specifically so limited in all forms of the invention) so as to have a sufficient top area of display surface means, as indicated at 22, to be capable of bearing demarked thereon, at the proper locations, a tool-joint-pin-identifying scale means, a tool-joint-box-identifying scale means and correlated tool-joint-pin-identifying markings and tool-joint-box-identifying markings, and also capable of bearing demarked thereon two actual-measurement-indicating scale means, having displacement-measurement-indicating scale means markings, and correlated displacement-measurement-indicating indicia positioned thereon and corresponding to actual outside diameter measurements measured by the caliper arms, to be described hereinafter, and also corresponding to actual inside diameter measurements measured by said caliper arms to be described hereinafter. Said various scale means, markings and indicia means and the important positional relationship thereof will all be described in detail hereinafter.

The display member 20 is provided with a first caliper arm, indicated at 24, extending rigidly outwardly from one edge (the edge 26) thereof so that a first caliper arm contact end 28 is defined at the terminus of the inner arcuate edge of said first caliper arm 24. A second caliper arm, indicated generally at 30, is also provided and is very much smaller than the first caliper arm 24 and, in the example illustrated, is shown as being of curvilinear shape and is pivotally joined with respect to the display member 20 carrying the first caliper arm 24 by pivotal mounting means generally designated by the reference numeral 32. The outer or free end of said second caliper arm 30 is provided with and defines at an inner edge thereof what might be termed a second caliper arm contact end, as indicated by the reference numeral 34, which together with the previously mentioned first caliper arm contact end 28 is to be used for tool-joint-pin-identifying purposes, tool-joint-box-identifying purposes, and for actual outside and inside diameter measuring purposes, as will be described hereinafter. The arrangement is generally such that the linear distance from the axis of the pivotal mounting means 32 to each of the two caliper arm contact ends 28 and 34 is substantially equal.

The previously mentioned pivotal mounting means 32 is of a frictional type adapted to maintain any relative positioning of the first and second caliper arm 24 and 30 until forcibly manually over-ridden during a relatively rotatable caliper-arm-re-adjusting operation, after which said caliper arms will again remain in the newly adjusted relationship by reason of the frictional engagement between the second caliper arm 30 and the display member 20, which is usually provided by an effective frictional mounting at or adjacent to the pivotal mounting means 32 effectively relatively rotatively interconnecting same.

The effective frictional mounting mentioned above may be provided by the use of a headed rivet, indicated generally at 36, and having an enlarged head 38 at one end, and intermediate rivet shaft portion 40 extending through the aligned holes 42 and 44 in the second caliper arm 30 and the display member 20, respectively, and carrying the bucked or flattened rivet end enlargement 46 at the opposite end thereof from the enlarged head 38. The space between the enlarged rivet head 38 and the opposite flattened end portion 46 may be made sufficiently short to maintain the biasing or clamping force against the intervening surfaces of the second caliper arm 30 and the display member 20 whereby to provide the type of frictional mounting, or frictionally engaged, characteristic of the pivotal mounting means 32 referred to above. Alternatively positive resilient biasing means may be employed, usually at the location of the pivotal mounting means 32, so as to provide positive resilient engagement between the adjacent portions of the second caliper arm 30 and the display member 20 even if the rivet shaft distance between the enlarged head 38 and the flattened opposite end 46 is not short enough to provide such positive frictional engagement by itself. One such exemplary representative and non-specifically limiting arrangement is illustrated in FIG. 7 and will be described in detail hereinafter.

The rear end of the second caliper arm 30 is provided with pointer means of milti-element actual displacement indicating means and tool-joint-pin-identification and tool-joint-box-identification indicating means. Said pointer means, in the example illustrated, includes two different pointers comprising the first outwardly directed pointer means 48 and the second inwardly directed pointer means 50. The outwardly directed pointer means 48 comprises a combination tool-joint-pin-identifying marker means and a tool-joint-box-identifying marker means which cooperates with two corresponding identifying scale means, generally designated by reference numerals 52 and 54, which will be described in greater detail hereinafter.

The inwardly directed pointer means 50 comprises a caliper end-displacement-indicating marker means for indicating actual outside diameters measured between the caliper arm contact ends 28 and 34 when they are spaced apart in the general manner shown in FIG. 1 and for indicating actual inside diameters measured between the caliper arm contact ends 28 and 34 when they are in a crossed-over relationship, such as that shown in FIG. 2 with the second caliper arm in the extreme leftward phantom-line position shown in said FIG. 2. Both of these two actual measurements of outside and inside diameters are made by the second inwardly directed marker means 50 by cooperation with corresponding actual measurement or actual displacement scale means, such as indicated generally by the reference numerals 56 and 58, which will be described in greater detail hereinafter.

It should be noted that the previously mentioned tool-joint-pin-identifying scale means 52 comprises a plurality of scale markings in the proper relative positional relationships to comprise the complete external diameter scale markings 56, and each extends outwardly into an indicating correspondence with respect to a corresponding line of tool-joint-pin-identifying information, such as generally designated by the reference numeral 60. Thus, it will be readily understood that when the contact ends 28 and 34 of the two caliper arms 24 and 30 are spaced apart in the general relationship shown in FIG. 1 and are placed in contact with the exterior of a tool joint pin, the pointer or marker means 48 will move arcuately to some particular location aligned with or adjacent to one of the tool-joint-pin-indicating scale means markings 59 which will indicate a corresponding one of the tool-joint-pin-identifying information lines 60 and it only remains for the thread size of the tool joint pin to then be checked through the use of one of the three thread gauges indicated at 62, 64, and 66 to provide full identification of exactly what tool joint pin one has been checking. This information of course makes it possible to match it up for subsequent threaded engagement with a corresponding tool joint box which is the primary purpose of the tool joint identifier feature of the invention. Correspondingly if one is checking a female tool joint box of unknown type, the movable second caliper arm contact end 34 will be moved into crossed-over relationship with respect to the first caliper arm contact end 28, such as is shown in the leftward phantom line extreme position of said second caliper arm 30 in FIG. 2, and the two contact ends 28 and 34 will then be placed within the unknown tool joint box and moved outwardly until in engagement therewith. It will be found that this moves the outwardly directed pointer or marker means 48 until it is in alignment with one of the individual line markings 68 of the previously mentioned tool-joint-box-identifying scale means 54 which in turn extends outwardly in a one-to-one correspondence with a corresponding line of tool-joint-box-identifying information, such as is generally designated by the reference numeral 70, so that one will have the proper identification information and the only step that remains will be the checking of the thread type and size the unknown tool joint box through the use of any one of the three thread gauges generally designated at 62, 64, and 66 once this has been done, the full information required to identify the unknown tool joint box will have been ascertained so that it may be exactly matched with a corresponding tool joint pin for threaded engagement therewith, which is the primary purpose of the tool joint identifier feature of the invention.

It will be noted that the previously referred to inwardly directed pointer or marker means 50 cooperates with the arcuate scale means 56 comprising actual exterior diameter displacement information corresponding to the actual measured distance between the spaced apart caliper arm contact ends 28 and 34 when measuring the exterior diameter of any desired objects within the permissible range of diameter sizes which can be measured by the caliper aspect of the invention. The outside diameter scale markings indicated at 56 are correlated with corresponding actual measurement indicia, indicated generally at 72, which indicate the actual exterior diameter measured between the spaced apart caliper arm contact end 28 and 34.

When the caliper arms 30 and 24 are crossed-over so that the second caliper arm 30 is in the extreme leftward phantom line position shown in FIG. 2, the caliper aspect of the invention may be said to be in an inside diameter measuring condition and it will be found that the inwardly directed pointer or marker ends 50 has now moved to the other arcuately displaced actual-inside-diameter-indicating scale means, generally designated by the reference numeral 58, which is correlated with corresponding inside-diameter-indicating actual measurement indicia means, generally designated by the reference numeral 74 and adapted to provide, by cooperation with the pointer or marker means 50, the actual distance between the crossed-over caliper arm contact ends 28 and 34 when measuring the inside diameter of any object.

Since tool joints (both pin portions and box portions) are normally provided in only a relatively few types and sizes of threads, it is only necessary to provide a corresponding number of the thread gauges, such as the three rigid, non-specifically limiting thread gauges generally designated at 62, 64, and 66. In the exemplary form thereof, the thread gauge 62 is of a type corresponding to four threads per inch of the 60° included angle type, which is widely used for tool joint threads. Also, in the exemplary form illustrated, the thread gauge 64 is of a type indicating five threads per inch with an included angle of 60° which is a widely used type of thread for tool joints. The exemplary and representative thread gauge indicated generally at 66 corresponds to a somewhat different type of thread having three and one half threads per inch of the 90° included angle type, which is commonly called a Hughes H90 thread which is also rather widely used in tool joints. It should be clearly understood that if it is found that other threads come into common usage in tool joints, additional thread gauges corresponding to such thread types and sizes may be added to the device.

FIG. 7 illustrates fragmentarily a very slight modification of the pivotal mounting means. Because it is a modification, it is generally designated by the reference numeral 32, primed, however. Indeed all parts of this slight modification which correspond structurally, functionally or otherwise to similar parts of the first form of the invention are designated by the same reference numerals, primed, however. It will be noted that, in this case, a "Bellville" dished or cup washer 76 is positioned between the rivet head 38' and the upper surface of the second caliper arm 30' and since it is of a bowed dished or convex-concave configuration, it is placed under stress when the rivet is initially bucked into place and, thus, it subsequently at all times comprises resilient biasing means exerting biasing force which acts to maintain positive frictional engagement between all of the adjacent relatively rotatable parts of the pivotal mounting means 32'. Of course, it should be clearly understood that the "Bellvile" washer may be turned over or may be positioned on the other side of the assembly or in between the two rotating parts if desired. Also, various other types of functionally equivalent biasing means or friction-maintaining means may be employed in lieu of the representative arrangement illustrated and described.

Also it should be noted that the configuration and layout of the apparatus may be modified somewhat, although the relative positional relationships of the various scale means and the information-indicating means are critical to the successful operation of the device.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

What is claimed is:

1. A tool joint caliper and identifier comprising a first caliper arm, a second caliper arm, pivotal connecting means adjacent to one end of said arms, the other end of each of said arms including a contact point for engagement with a pin or box tool joint, said one end of said second caliper arm including an extension having a pointer thereon movable in a circular path about an axis defined by the pivotal connecting means, said pointer including oppositely facing points disposed along angularly spaced radii extending from said axis, said one end of said first caliper arm including a panel member forming an extension thereof, said panel member including a pair of arcuate, concentrically spaced graduated scales thereon associated with said points on said second caliper arm, and indicia disposed adjacent to each of said scales for respectively indicating the diameter of and identifying a tool joint engaged by the contact points to facilitate making up a drill string, each of said concentrically spaced graduated scales including a pair of arcuate scales spaced circumferentially along the arc of movement of the pointer, the inner of the concentrically spaced scales being associated with the radially inward point with the inner pair of arcuate scales and indicia associated therewith designating the internal diameter of a box tool joint or the external diameter of a pin tool joint engaged by said contact points, the outer point and outer pair of arcuate scales and indicia associated therewith identifying a box tool joint or a pin tool joint engaged by said contact points, said second caliper arm being in the form of an arcuate member with the contact point being at the outer end of the concave edge thereof, said first caliper arm including a concave arcuate edge having a contact point at the outer end thereof, said contact points engaging opposite external surfaces of a pin tool joint when disposed in spaced opposed relation, said caliper arms being disposed in two separate planes to enable the contact points to cross over and engage opposite internal surfaces of a box tool joint, said pivotal connecting means being located at the end of the arms remote from the contact points, the end of the panel member having the concave edge and contact point including a notch in the edge thereof adjacent the contact point to reduce the overall width of the end of the panel member having the contact point thereon to facilitate insertion into box joints having a relatively small internal diameter, said notch including an outwardly facing edge provided with thread-shaped recesses therein to serve as a thread gauge with the inner edge of the notch serving as a limit for the longitudinal movement of the end of the panel member in relation to a tool joint, said panel member including an end edge remote from the contact point at the outer end of the concave outer edge, an extension on said end edge of substantially less width than the end edge to facilitate manipulation of the panel member, said extension including thread-shaped recesses in each longitudinal edge thereof forming thread gauges with the adjacent edge portions of the panel member at the inner end of the extension defining means limiting the longitudinal movement of the extension in relation to a tool joint.

* * * * *